United States Patent
Neuhaus

(10) Patent No.: US 7,953,437 B2
(45) Date of Patent: May 31, 2011

(54) SYSTEM FOR SWITCHING, CONTROLLING, PROGRAMMING AND OPERATING COMMUNICATION DEVICES

(75) Inventor: Ralf Neuhaus, Lünen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1004 days.

(21) Appl. No.: 10/748,584

(22) Filed: Dec. 30, 2003

(65) Prior Publication Data

US 2004/0162110 A1  Aug. 19, 2004

Related U.S. Application Data

(63) Continuation of application No. PCT/DE02/02206, filed on Jun. 17, 2002.

(30) Foreign Application Priority Data

Jul. 4, 2001 (DE) .................................. 101 32 276

(51) Int. Cl.
*H04B 1/38* (2006.01)
(52) U.S. Cl. ............... 455/557; 455/556.1; 348/14.04
(58) Field of Classification Search ............ 455/557, 455/556.1, 567, 457, 415; 348/14.01, 14.02, 348/14.03, 14.04, 14.07
See application file for complete search history.

(56) References Cited

U.S. PATENT DOCUMENTS

| 3,746,793 | A | * | 7/1973 | Sachs et al. ............... 379/52 |
| 5,410,326 | A | * | 4/1995 | Goldstein ............... 348/734 |
| 5,805,677 | A | * | 9/1998 | Ferry et al. ............... 379/93.35 |
| 5,907,604 | A | * | 5/1999 | Hsu ............... 379/142.06 |
| 5,948,080 | A | * | 9/1999 | Baker ............... 710/37 |
| 6,061,434 | A | | 5/2000 | Corbett |
| 6,535,590 | B2 | * | 3/2003 | Tidwell et al. ............... 379/110.01 |
| 7,058,356 | B2 | * | 6/2006 | Slotznick ............... 455/3.05 |

FOREIGN PATENT DOCUMENTS

| EP | 0 884 90 7 A | 12/1998 |
| WO | WO 02/43350 A2 | 5/2002 |
| WO | WO 02/43350 A3 | 5/2002 |

* cited by examiner

*Primary Examiner* — Nay Maung
*Assistant Examiner* — Angelica M Perez

(57) ABSTRACT

The invention relates to a system for switching, controlling, programming and operating communications devices, particularly communications terminals or communications systems. According to the invention, the at least one communications device (TE1, TE2, MOF, SYS) can be connected to at least one entertainment terminal (FER) via at least one interface (IEE), and the communications device TE1, TE2, MOF, SYS) and the at least one entertainment terminal (FER) are configured for exchanging signals and/or data via the at least one interface (IEE). The communication device is configured to switch from a first mode to an administrative mode to search for an active entertainment terminal. The entertainment terminal (FER) advantageously has at least one display (ANZ) and at least one input (BED). The entertainment terminal is, for example, a television set (FER).

16 Claims, 3 Drawing Sheets

SYSTEM FOR SWITCHING, CONTROLLING, PROGRAMMING AND OPERATING COMMUNICATION DEVICES

CROSS REFERENCE TO RELATED APPLICATIONS

This application is a continuation of International Application No. PCT/DE02/02206, filed Jun. 17, 2002 and claims the benefit thereof. The International Application claims the benefits of German application No. 10132276.3 filed Jul. 4, 2001, both of the applications are incorporated by reference herein in their entirety.

FIELD OF INVENTION

The invention relates to a system for switching, controlling, programming and operating communication devices, particularly communication terminals or communication systems.

BACKGROUND OF INVENTION

If one considers a typical infrastructure in a private house, it is normally possible to find there both communication terminals, usually in the form of landline and/or mobile radio telephones, and a series of entertainment terminals, i.e. consumer electronics units, audio terminals or video terminals, for example television sets.

The majority of users are well versed in operating the entertainment units, since they made their entrance into users' homes a relatively long time ago now. In particular, modern television sets, for example, are particularly simple to operate and program using menu guides, and this can normally also be done in a convenient way using a remote control.

On the other hand, modern telecommunication terminals or systems frequently have functions which are, in principle, advantageous to a user, such as an internal telephone book containing telephone numbers associated with persons' names, call-number display, and also have functionalities such as call diversion, brokering, call hold, etc.

However, many users find the operation and programming of such telecommunication units to be too complicated, which means that these advantages are exploited only rarely. This can usually be attributed to a complicated menu guide on the telecommunication units, but particularly to the small information displays and also the small displays with only a slight opportunity for display.

For today's communication systems, including private branch exchanges, for example, the following administration options exist:
using a connected telephone;
using a specific PC tool, with administration being able to take place locally or remotely;
using a web browser, likewise locally or remotely;
using a terminal connection, for example Telnet;
using a network management environment.

However, none of these options present any real facilitation for the "normal", average home use, and often even complicate the operaton of the communication systems, since the options listed are not user interfaces which are known to an average user.

SUMMARY OF INVENTION

It is an object of the invention to simplify the use of telecommunication devices to a considerable degree and, in particular, to reduce the hindrance threshold preventing many users from using complicated functionalities on such devices.

This object is achieved with a system as mentioned in the introduction by virtue of the invention allowing the at least one communication device to be connected to at least one entertainment terminal via at least one interface, and the communication device and also the at least one entertainment unit being set up to interchange signals and/or data via the at least one interface.

The invention lifts the strict division today between conumer electronics units and communication units, and all-embracing use of functions is made possible.

The control, programming, operation etc. of the communication units or systems can be made particularly advantageous if the entertainment terminal has at least one display and, in addition, sometimes also has at least one input facility. In this context, the input facility can be a keyboard attached to the entertainment terminal or else a remote control, as is customary and known for modern entertainment units.

It is expedient if the entertainment terminal is a television set in a known manner. Virtually every household contains such a television set, and most users are also familiar with the operation thereof, which means that operation and control can be made particularly simple using a television set. In particular, operation is also simplified by the television set's large screen in this case.

The interface for linking a telecommunication unit or system to the entertainment terminal is usually a wired interface. However, for understandable reasons, it is particularly beneficial if the interface is a wireless interface.

By way of example, the interface is a radio interface, for example based on the known "Bluetooth" standard.

For rapid transmission of large volumes of data, it is beneficial if the interface is a high-speed interface. By way of example, wireless transmission can take place via an interface based on the planned, "hyper-LAN2" standard. Particular features of this standard are a high bandwidth (>50 Mbit/s), the opportunity for direct point-to-point transmission between two terminals, and bandwidth reservation.

In one specific embodiment of the invention, the interface transmission is based on the Firewire standard.

A tried and tested embodiment of the invention is distinguished in that the communication terminal or communication system is set up to search for an active entertainment terminal connected to the unit/system upon activation of an administration mode. If, for example on a telephone, the appropriate keys are pressed to preselect the option relating to administration, i.e. relating to programming or management of the functions, settings, data etc., on the telephone, then the telephone searches for an active, connected entertainment unit, for example a television, which is used for the telephone's administration.

It is of particular advantage for a user if an "on screen menu", i.e. a menu structure on the entertainment terminal's display, is displayed for administration purposes. By way of example, TV sets and their remote controls already provide appropriate keys for selecting menu items for the purpose of operating these functions and are therefore already more familiar to the user than an interface which is completely new to him in a communication system, which means that the users' reluctance to use the more complicated functions on the communications units can be greatly reduced.

In one specific embodiment of the invention, the communication terminal or communication system is set up to search for an active entertainment terminal connected to the unit/ system upon an incoming call and to set up a connection to said entertainment terminal and to transmit the relevant information.

By way of example, the communication terminal/communication system can be set up to transmit state-dependent information to an active entertainment terminal. In this context, it can be beneficial, for the purpose of simple use, if the calling connection's call number is inserted for an incoming call, for example.

It can also be expedient if the apparatus has at least one associated database for insert symbols corresponding to the state-dependent information which are able to be inserted on the entertainment terminal in line with the information transmitted to said entertainment terminal.

In one tried and tested embodiment, the at least one database is associated with the communication device.

If the database is a photograph and/or symbol database and/or a name database, then, by way of example, a photograph of the caller and/or a symbol associated with the caller and/or the name of the caller can be inserted on the entertainment unit, which naturally greatly simplifies recognition of the caller.

In this context, the at least one database is normally stored on at least one memory device which is associated with the apparatus, in which case it is particularly expedient if the at least one memory device is a memory device in a communication terminal or system which is connected to the entertainment terminal.

BRIEF DESCRIPTION OF THE DRAWINGS

The invention is explained in more detail below with reference to the drawing, in which.

DETAILED DESCRIPTION OF INVENTION

Figure 1:
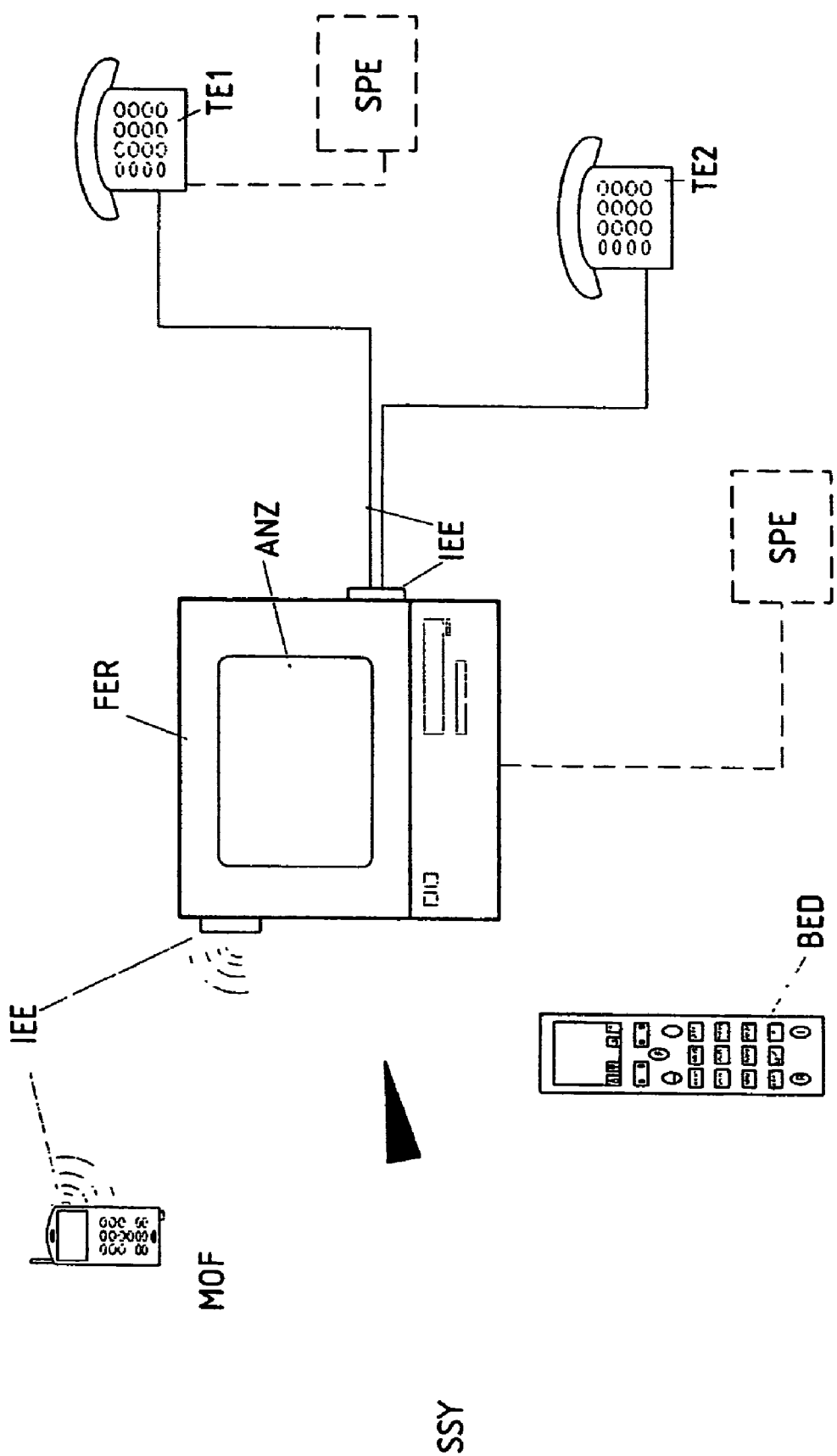
FIG. 1 shows a schematic illustration of a first exemplary system in accordance with the invention.

The aim of the invention is the use of entertainment terminals, preferably having a screen, for example on an ordinary television set FER, as shown in FIG. 1, for controlling, programming, operating etc. communication devices, particularly telecommunication terminals and systems. The background of the invention is the idea that many private customers have a high hindrance threshold preventing them from using technical units whose operation is complicated, such as telecommunication units TE1, TE2, MOF, TE1'-TE3' or telecommunication systems SYS—for example a telecommunication installation ANL with connected telephones TE1-TE3' and mobile radios MOF'. The complexity of the operation therefore means that there is frequently deliberate use of only simple telephones for the purposes of telecommunication, or many of the possible functions are barely used or not used at all. What there is in virtually every household and has long been accepted as a technical unit, however, is a television set, for example.

Figure 2:
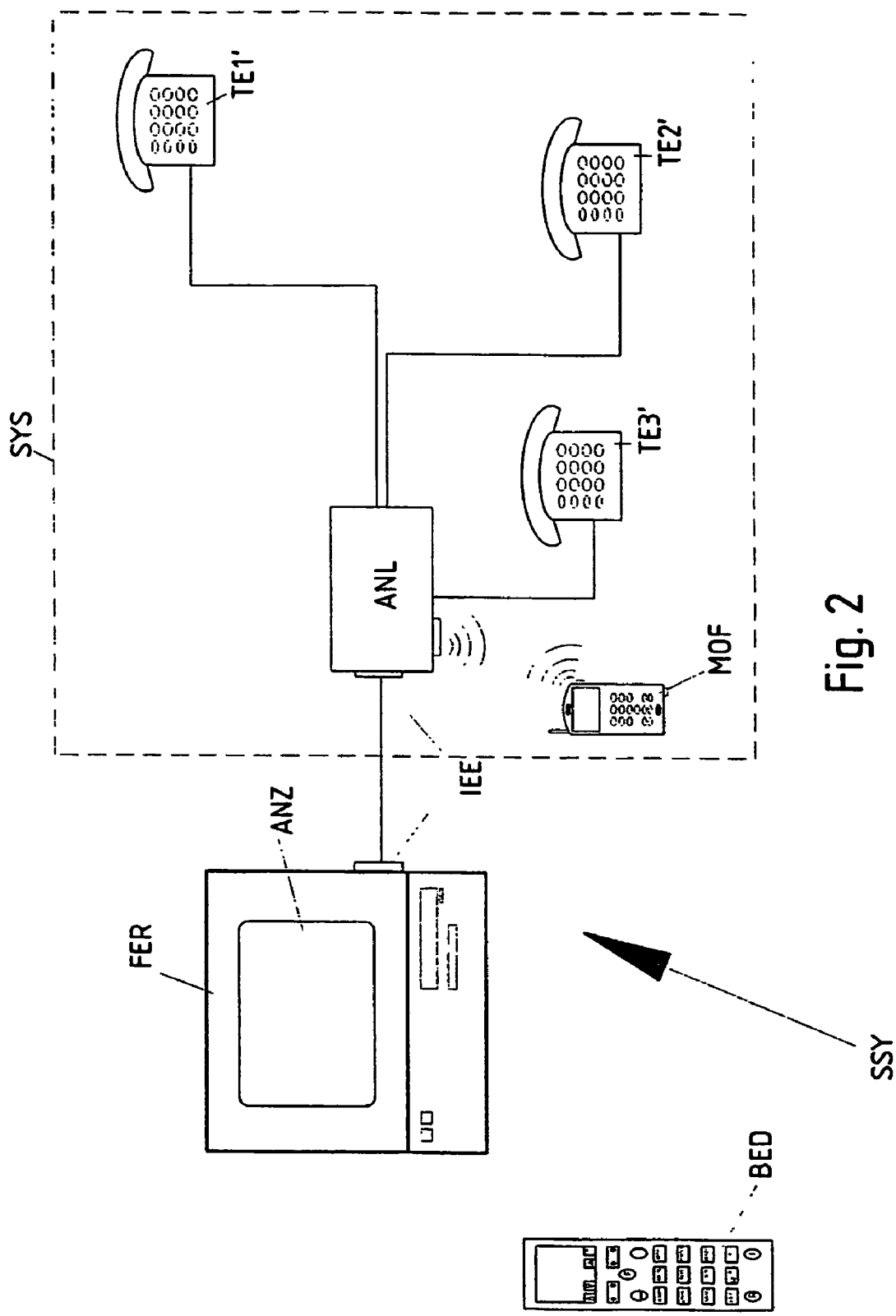
FIG. 2 shows a further schematic illustration of an exemplary system in accordance with the invention.

To allow operation, programming and control of complicated telecommunication systems and units to be simplified for users, the invention now involves one or more such communication units TE1, TE2, SYS or telecommunication systems SYS for example a telecommunication installation SYS having a plurality of connected terminals TE1-TE3', as shown in FIGS. 1 and 2, being connected to the entertainment unit FER via appropriate interfaces IEE to form an inventive system SSY, as shown in FIGS. 1 and 2. The telecommunication terminals or systems can, for their part, be connected to communication networks (not shown in the drawing).

In this context, mention will first be made of the fact that the communication units do not have to be linked directly to the entertainment unit FER, but rather that it is also entirely possible to link the communication units to a different communication device connected to the entertainment terminal if doing so proves to be expedient.

The operation etc. of the connected communication terminals is particularly simplified if the entertainment terminal has a display ANZ, such as a screen on a television set, and also additionally has an input facility, for example in the form of a remote control BED.

The transmission interface IEE used for data and control is, in particular, an interface based on the "Firewire"standard (also known under IEEE1394 "Institute of Electrical and Electronics Engineers"). This involves a serial high-performance bus which can be used to connect apparatuses to a computer or to another control or operating unit, for example to an entertainment terminal within the context of the invention. Firewire affords a simple "plug and socket" connection, with the possibility for up to 63 units to be connected at data transfer rates of up to 400 Mbit/s (megabits per second). The Firewire standard describes a serial bus or a connection between one or more peripheral units and the microprocessor in the computer or control unit. The high data transmission rates mean that this interface is suitable for multimedia applications. In addition, Firewire affords the option of "hot plug" and "plug and play", which means that connecting a further unit, for example, does not require the computer or the operating unit to be shut down and restarted, so that it is possible to connect any apparatus to the computer etc. during operation.

Firewire (IEEE 1394) affords two types of data transfer, namely asynchronous and isochronous. Asynchronous data transfer is used for traditional load and store applications, where the data transfer is initiated and an application is interrupted when a prescribed length of data have been received in a buffer.

Isochronous data transfer ensures that the flow of data takes place at a previously stipulated rate, which means that an application can handle the flow of data in a manner which is stipulated precisely over time. This reduces the need for buffer-storage for multimedia applications, and continuous presentation is ensured for the viewer.

The interface IEE can be a wireless interface, for example a radio interface. This will probably also involve the use of Firewire on the basis of the future European standard HiperLAN2. Particular features of this standard are again a high bandwidth (>50 Mbit/s), the option of direct point-to-point transmission between two terminals and bandwidth reservation.

Starting from a standard such as was created by the HAVI ("Home Audio Video Interoperability") initiative, for example, which is intended to simplify cooperation between various entertainment terminals, it is now possible for units connected by means of a bus, such as Firewire or Wireless-FireWire, to communicate with one another, to control one another and to use resources from another unit. The present invention uses this opportunity for displaying (tele)communication-specific information on a screen on an entertainment terminal, preferably a television set. On a general basis, the invention allows state-dependent inserts to be placed on the screen while the television is in operation. By way of example, an incoming call can be displayed in a window which is opened in the current television picture. In this case, the caller's name and call number, for example, can be inserted as additional information, or a photo of the caller is inserted.

The corresponding information, to be precise a name or photo of a caller, as mentioned above, which are associated with a particular call number, is stored in a database which is associated with the inventive apparatus. In this case, the database is stored in a memory device SPE which is associated with the apparatus. In terms of the association of the memory device, it is possible in this case for said memory device to be linked directly to the entertainment terminal FER. It can also be linked to a communication device TEL, SYS, however, or the memory device can also be integrated in a communication device TEL, SYS. It is naturally also possible for a plurality of databases, which are stored on various memory devices SPE, for example on a plurality of communication devices TEL, SYS linked to the entertainment terminal FER, to be available, in which case all devices TEL, SYS connected to the entertainment terminal FER can then use these databases reciprocally, which is also the most advantageous embodiment of the invention.

A prerequisite for the invention to work is an appropriate interface in a telecommunication terminal TE1, TE2, MOF or in the telecommunication system SYS, which acts more as a communication server in this environment. In line with the definition of the Firewire standard, data terminals having a high bandwidth are naturally also supported. On the basis of this physical interface, the communication end now also needs to implement the necessary protocols for the higher layers, which then permit corresponding communication with TV sets, for example based on the Havi standard already mentioned above ("HAVI specification 1.1" dated May 15, 2001, for example at http://www.havi.org).

Figure 3:
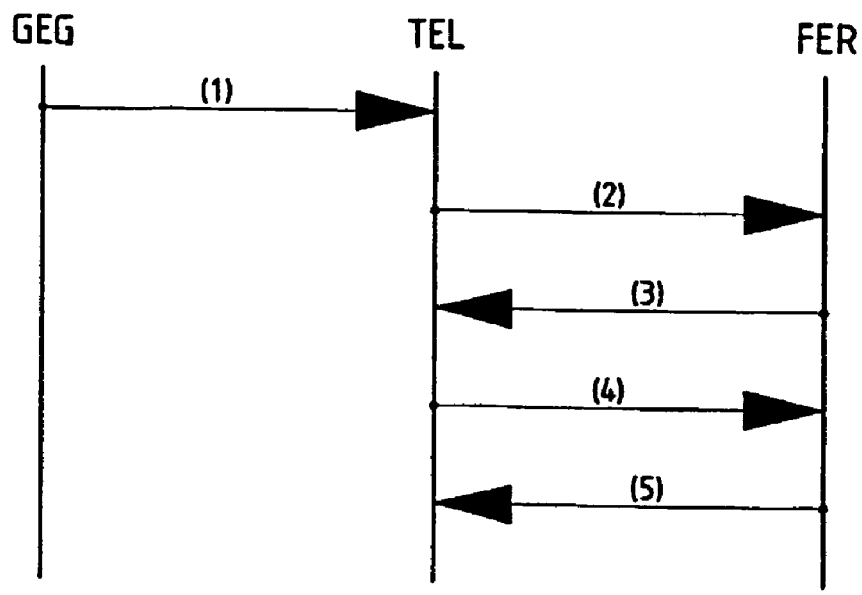
FIG. 3 shows an exemplary signaling sequence for a call incoming on a telecommunication system or terminal.

The text below will explain the signaling sequence shown in FIG. 3 with reference to a call incoming on a communication unit TEL which is connected to an entertainment terminal FER:

A call (1) coming from a remote station GEG is signaled in the communication terminal, for example a telephone TEL, usually in connection with call number information for the caller.

When the caller information has arrived, an active television set FER is sought (2) via the interface IEE.

If such a television set FER is found, which then accordingly reports (3) to the telephone TEL, the telephone TEL sends a request for the insert of a report or information window to this unit FER, and information associated with the caller is sent (4) to the TV set FER as content for this window. By way of example, the telephone can contain information associated with the call number, such as the caller's name etc., which is then displayed in connection with or instead of the call number. With the option of output on a graphical display or screen, it is also appropriate for the communication unit TEL to store a photograph or symbol database, stored on a memory in the telephone, for example, and for corresponding information to be displayed on the screen. The screen now displays a window in which the transmitted information are shown. The TV viewer is thus able to recognize who is currently calling at one glance.

As an extension to the pure display functionality, it is also possible to allow control in the opposite direction. The screen of the television set FER presents (simple) selection options for how to proceed with the call, for example "forward call to telephone answering machine", "switch telephone to speakerphone", "mute", "insert information" etc. The functions offered, which can also be shown as symbols, can then easily be selected and activated, for example using the remote control BED for the television FER. In this case, in line with the selected and activated options, corresponding control signals are transmitted (5) to the communication unit, which then performs the corresponding action(s).

In line with the invention, the information which is inserted on the television set is stored in one or more databases which are associated with the inventive apparatus. In this case, the database(s) is/are stored on one memory device or in distributed form on a plurality of memory devices SPE, which are linked either to the entertainment terminal and/or to the communication units/systems. By way of example, a photograph or symbol database can exist which is associated with a unit, for example the entertainment terminal, while one or more telephone books are stored in one or more telephone sets. In terms of the association between call numbers and/or names and corresponding photos, however, it can be advantageous in terms of simpler logic combination for these data to be stored in a single database, even though logic combination of information stored in different databases ought not to present any great problem.

However, preference is given to one variant embodiment of the invention in which the contents produced on the television set FER come directly from a communication unit TEL or from a communication system SYS, for example by resorting to an internal database. This information is then transmitted via the corresponding interfaces IEE, with the type of transmission being stipulated by means of the appropriate standards, and the entertainment terminal, particularly the television set FER, is in this case used only as a display or operation terminal.

In the same way, telephone books, which are stored in the internal database of a connected communication terminal TEL, for example, can also be displayed on the screen ANZ of the television set FER for the purpose of setting up a call. The telephone number or associated symbols from a symbol library are then displayed on the screen ANZ and can be dialed and called by the user.

Figure 4:
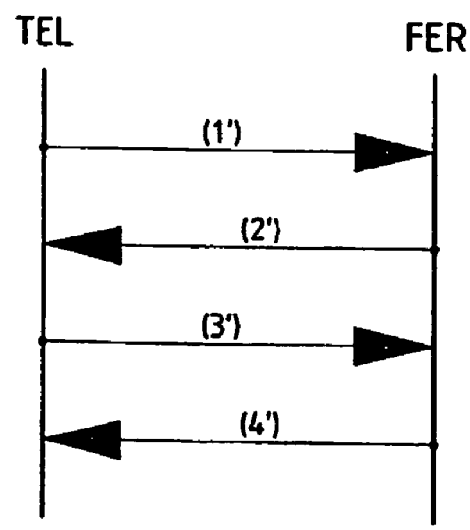
FIG. 4 shows an exemplary signaling sequence for the administration of a telecommunication terminal in accordance with the invention.

Finally, FIG. 4 shows a signaling sequence for the administration of a communication terminal TEL in an inventive system SYS:

If a user of a communication terminal TEL activates the "administration" function, then the communication terminal TEL first searches for a suitable output medium, i.e. an active television set FER (1').

If such a television set FER is found, a request for inserting an on screen menu is sent (3') to said television set following an acknowledgement (2'). As content for this window (on screen menu), the individual menu contents and selection items are sent to the television set FER. The screen ANZ of the television set FER now shows a window showing the transmitted information. The user now has the option of navigating within the items offered, of displaying help text and of activating individual items. Provision can also be made for text input, e.g. by inserting a virtual keyboard.

Following selection, the selection information is transmitted from the television set FER to the communication terminal TEL (4') where the corresponding parameters are altered.

The invention gives rise to a "convergence" of the telecommunication world and the entertainment world, which means that many fundamentally communication-external standards can advantageously be used for the telecommunication world as an aid to simple use for the user. A typical modern and future home environment contains not only components of consumer electronics (Hifi, TV, video, . . . ) but also communication terminals (telephone(s)/telephone system, in future even "communication servers", which can be used to conduct a wide variety of types of communication, such as telephony, SMS, chat, etc.). This invention allows a user to use a user interface with which he is familiar for new application purposes. The operation of a modern television set, which is now easy to perform even for unpracticed users using a screen menu guide, can now additionally be used for operating and programming units which are actually foreign to the genre, such as communication systems/telephone systems. The user now operates the telephone system more or less in the manner of his modern television or video recorder.

The invention claimed is:

1. A system for switching, controlling, programming and operating at least one communication device, comprising:
    at least one communication device; and
    at least one entertainment terminal, the at least one entertainment terminal connectable to the at least one communication device via at least one interface, the at least one entertainment terminal comprised of a display, the at least one communication device and at least one entertainment terminal configured to interchange at least one of signals and data via the at least one interface, the at least one entertainment terminal comprised of an active entertainment terminal;
    the at least one communication device configured to automatically search for the active entertainment terminal when an administrative mode of the at least one communication device is selected such that the at least one communication device is connectable to the active entertainment terminal so that a selection menu is displayable on the display of the active entertainment terminal after the active entertainment terminal is detected.

2. The system of claim 1 wherein at least one of the at least one communication device and at least one entertainment terminal is also comprised of a memory device that has a database, the database having insert symbols corresponding to state-dependent information that is displayable on the display of the at least one entertainment terminal 3. The system of claim 2 wherein at least one of the at least one communication device and the at least one entertainment terminal is also comprised of memory that has a database, the database having insert symbols associated with at least one caller, each symbol being displayable on the display of the active entertainment terminal.

4. The system of claim 1 wherein the at least one communication device is configured to switch to the administration mode upon receiving an incoming call to set up a connection to the active entertainment terminal.

5. The system of claim 1 wherein the at least one entertainment terminal is a television.

6. The system of claim 1 wherein the at least one communication device is comprised of at least one telephone.

7. The system of claim 1 wherein the at least one communication device is comprised of at least one mobile radio.

8. The system of claim 1 wherein the at least one interface is a wireless interface, a radio interface or a high speed interface.

9. The system of claim 1 wherein the at least one interface is configured to transmit and receive data based on a Firewire standard.

10. The system of claim 1 wherein the at least one communication device is also configured to transmit state dependent data to the active entertainment terminal.

11. The system of claim 1 further comprising a memory device or memory service that is connected to the at least one communication device.

12. The system of claim 1 further comprising a memory device or memory service that is connected to the at least one entertainment terminal.

13. The system of claim 1 wherein the at least one entertainment terminal is also comprised of at least one input facility.

14. The system of claim 1 wherein the at least one input facility is a remote control.

15. The system of claim 1 wherein the at least one communication device is configured to switch from a first mode to the administrative mode, the first mode and the administrative mode both requiring the at least one communication device to be powered for operation such that the administrative mode and the first mode are not operational when the at least one communication device is deactivated.

16. A system for switching, controlling, programming and operating at least one communication device, comprising:
    at least one communication device; and
    at least one entertainment terminal, the at least one entertainment terminal connectable to the at least one communication device via at least one interface, the at least one entertainment terminal comprised of a display, the at least one communication device and at least one entertainment terminal configured to interchange at least one of signals and data via the at least one interface, the at least one entertainment terminal comprised of an active entertainment terminal;
    the at least one communication device configured to switch from a first mode to an administrative mode, the first mode and administrative mode both requiring the at least one communication device to be powered for operation, the at least one communication device configured to automatically search for the active entertainment terminal when the administrative mode is selected such that a selection menu is displayable on the display of the active entertainment terminal after the active entertainment terminal is detected, the display of the active entertainment terminal also configured to receive input comprised of at least one of text and call administration data that is transmittable via touching the display, the display configured to transmit the input received by the display to the at least one communication device to effect administration of a call.

* * * * *